(12) United States Patent
Song et al.

(10) Patent No.: US 8,407,233 B2
(45) Date of Patent: Mar. 26, 2013

(54) METHOD FOR CALCULATING RELEVANCE BETWEEN WORDS BASED ON DOCUMENT SET AND SYSTEM FOR EXECUTING THE METHOD

(75) Inventors: Ki Ho Song, Seoul (KR); Byoung Hak Kim, Seoul (KR); Min uk Kim, Seoul (KR); Tae Yeong Kwak, Seoul (KR)

(73) Assignee: NHN Business Platform Corporation, Seongnam-si (KR)

( * ) Notice: Subject to any disclaimer, the term of this patent is extended or adjusted under 35 U.S.C. 154(b) by 572 days.

(21) Appl. No.: 11/953,769

(22) Filed: Dec. 10, 2007

(65) Prior Publication Data

US 2008/0140648 A1    Jun. 12, 2008

(30) Foreign Application Priority Data

Dec. 12, 2006  (KR) ................ 10-2006-0126272

(51) Int. Cl.
*G06F 7/00* (2006.01)
*G06F 17/30* (2006.01)
(52) U.S. Cl. .............. 707/750; 707/727; 707/730
(58) Field of Classification Search ............... None
See application file for complete search history.

(56) References Cited

U.S. PATENT DOCUMENTS

| | | | | |
|---|---|---|---|---|
| 5,136,686 A * | 8/1992 | Koza | ............... | 706/13 |
| 5,579,224 A * | 11/1996 | Hirakawa et al. | ............ | 704/2 |
| 5,598,557 A * | 1/1997 | Doner et al. | ............ | 1/1 |
| 5,870,740 A * | 2/1999 | Rose et al. | ............ | 1/1 |
| 5,943,669 A * | 8/1999 | Numata | ............ | 1/1 |
| 6,044,376 A * | 3/2000 | Kurtzman, II | ............ | 1/1 |
| 6,070,158 A * | 5/2000 | Kirsch et al. | ............ | 1/1 |
| 6,216,123 B1 * | 4/2001 | Robertson et al. | ............ | 1/1 |
| 6,298,344 B1 * | 10/2001 | Inaba et al. | ............ | 1/1 |
| 7,113,943 B2 * | 9/2006 | Bradford et al. | ............ | 707/739 |
| 7,444,356 B2 * | 10/2008 | Calistri-Yeh et al. | ............ | 1/1 |
| 7,734,614 B2 * | 6/2010 | Aoki et al. | ............ | 707/711 |
| 2004/0249802 A1 * | 12/2004 | Okumura et al. | ............ | 707/3 |
| 2006/0259481 A1 * | 11/2006 | Handley | ............ | 707/5 |
| 2009/0037390 A1 * | 2/2009 | Handley | ............ | 707/3 |

FOREIGN PATENT DOCUMENTS

| | | |
|---|---|---|
| JP | 2005-250762 | 9/2005 |
| JP | 2005-309706 | 11/2005 |
| KR | 10-2006-48583 A | 5/2006 |
| KR | 10-2006-115261 A | 11/2006 |
| KR | 10-2006-122276 A | 11/2006 |

OTHER PUBLICATIONS

Kang, Jin-Sae, "Ontology Construction and Its Application to Disambiguate Word Senses", Korean Information Processing Society, Apr. 2004.

* cited by examiner

*Primary Examiner* — Khanh Pham
*Assistant Examiner* — Azam Cheema
(74) *Attorney, Agent, or Firm* — H.C. Park & Associates, PLC

(57) ABSTRACT

A method and system for calculating a relevance between words using a document set is provided. The method of calculating the relevance between words based on a document set, includes: obtaining statistical information about the words based on at least one of the words, documents, a word classification of the words, and a document classification of the documents, wherein the words and the documents are included in the document set; standardizing the statistical information; and calculating the relevance between the words based on the standardized statistical information.

23 Claims, 14 Drawing Sheets

| | DOCUMENT 1 | DOCUMENT 2 | DOCUMENT 3 | DOCUMENT 4 | DOCUMENT 5 | DOCUMENT 6 | DOCUMENT 7 |
|---|---|---|---|---|---|---|---|
| WORD 1 | 5 | 7 | 0 | 2 | 0 | 0 | 0 |
| WORD 2 | 8 | 4 | 1 | 1 | 0 | 0 | 0 |
| WORD 3 | 4 | 6 | 4 | 5 | 8 | 7 | 3 |
| WORD 4 | 0 | 0 | 0 | 3 | (5) — 201 | 0 | 6 |

|  | WORD 1 | WORD 2 | WORD 3 | WORD 4 |
|---|---|---|---|---|
| WORD 1 | 3 | 3 | 3 | 1 |
| WORD 2 | 3 | 4 | 4 | 1 |
| WORD 3 | 3 | 4 | 7 | 3 |
| WORD 4 | 1 | 1 | 3 | 3 |

| | DOCUMENT CLASSIFICATION 1 | DOCUMENT CLASSIFICATION 2 |
|---|---|---|
| WORD 1 | (14) | 0 |
| WORD 2 | 14 | 0 |
| WORD 3 | 19 | 18 |
| WORD 4 | 3 | 11 |

| 501 — | DOCUMENT FREQUENCY | DOCUMENT CLASSIFICATION FREQUENCY | — 502 |
|---|---|---|---|
| WORD 1 | 3 | 1 | |
| WORD 2 | 4 | 1 | |
| WORD 3 | 7 | 2 | |
| WORD 4 | (3) | (2) | |

| 601 | DOCUMENT CLASSIFICATION 1 | DOCUMENT CLASSIFICATION 2 | DOCUMENT CLASSIFICATION 3 |
|---|---|---|---|
| WORD 1 | 6 | 3 | 1 |
| WORD 2 | 7 | 4 | 1 |
| WORD 3 | 7 | 7 | 3 |
| WORD 4 | 2 | 3 | 3 |

|  | WORD 1° | WORD 1ˣ |
|---|---|---|
| WORD 2° | 3 | 1 |
| WORD 2ˣ | 0 | 3 |

| X\Y | a | b | c | d |
|---|---|---|---|---|
| a | 0 | 2 | 0 | 0 |
| b | 0 | 0 | 1 | 1 |
| c | 1 | 0 | 0 | 0 |
| d | 0 | 0 | 0 | 0 |

1202 ⁓ I(X,Y) = 1.05492 pmi(a,b) = 0.36652 pmi(b,c) = 0.18326 pmi(b,d) = 0.18326 pmi(c,a) = 0.32189

| DOCUMENT VECTOR | invL$_2$ | cos. | Dic.$^V$ | Jac.$^V$ | corr. |
|---|---|---|---|---|---|
| (WORD1, WORD2) | 0.048 | 0.875 | 0.875 | 0.778 | 0.808 |
| (WORD1, WORD3) | 0.007 | 0.556 | 0.491 | 0.326 | -0.06 |
| (WORD1, WORD4) | 0.007 | 0.081 | 0.081 | 0.042 | -0.48 |

| | 1401 | 1402 | 1403 | 1404 | 1405 |

| | FREQUENCY VECTOR | | | | |
|---|---|---|---|---|---|
| DOCUMENT VECTOR | invL$_2$ | cos. | Dic.$^V$ | Jac.$^V$ | corr. |
| (WORD1, WORD2) | 0.333 | 0.991 | 0.971 | 0.944 | 0.943 |
| (WORD1, WORD3) | 0.045 | 0.933 | 0.811 | 0.682 | 0.440 |
| (WORD1, WORD4) | 0.077 | 0.761 | 0.750 | 0.600 | -0.58 |

| BINARY DOCUMENT VECTOR | invL$_2$ | cos. | Dic.$^V$ | Jac.$^V$ | corr. |
|---|---|---|---|---|---|
| (WORD1, WORD2) | 0.5 | 0.866 | 0.857 | 0.750 | 0.750 |
| (WORD1, WORD3) | 0.2 | 0.655 | 0.600 | 0.429 | 0.000 |
| (WORD1, WORD4) | 0.2 | 0.333 | 0.333 | 0.200 | -0.17 |

| | odds. | mi | mi/J. | p$_v$(w) | f$_v$(w) |
|---|---|---|---|---|---|
| (WORD1, WORD2) | 0.987 | 0.362 | 0.360 | 0.429 | 0.143 |
| (WORD1, WORD3) | -0.14 | 0.000 | 0.000 | 0.429 | 0.119 |
| (WORD1, WORD4) | -0.20 | 0.014 | 0.010 | 0.143 | -0.05 |

| | 1406 | 1407 | 1408 | 1409 | 1410 |

METHOD FOR CALCULATING RELEVANCE BETWEEN WORDS BASED ON DOCUMENT SET AND SYSTEM FOR EXECUTING THE METHOD

CROSS-REFERENCE TO RELATED APPLICATION

This application claims the benefit of Korean Patent Application No. 10-2006-0126272, filed on Dec. 12, 2006, in the Korean Intellectual Property Office, the disclosure of which is incorporated herein by reference.

BACKGROUND OF THE INVENTION

1. Field of the Invention

The present invention relates to a method and system for calculating a relevance between words based on a document set, and more particularly, to a method for measuring a frequency of words of the document set according to various characteristics, obtaining statistical information based on the measured frequency, standardizing the obtained statistical information, and calculating a relevance between words based on the standardized statistical information, and thereby expressing the relevance as a numerical value, and a system for implementing the method.

2. Description of Related Art

Generally, people can understand the common relation between words by intuition. For example, people know there is a very close relation between 'soccer shoes' and 'a soccer ball', but there is no particular relation between 'soccer shoes' and 'vehicle'. Therefore, while reading a document, people know that the document is associated with some particular words. Although the words are excluded from the document, people may figure out some related words.

However, computer systems, such as search engines and the like, cannot understand the common meaning between words. Thus, an operation of classifying words or documents associated with a predetermined document set must be performed through manual processes. Even though a particular document is retrieved from the document set in association with a query, a document that is unassociated with the query, i.e., a document that simply includes contents of the query, may be retrieved and provided as a search result.

If a relevance between words can be indicated as a numerical value, computer systems may classify words or documents based on the relevance between the words. The relevance may be used for document searching. For example, the relevance between 'soccer shoes' and 'a soccer ball' can be set to 0.95, the relevance between 'soccer shoes' and 'nike' can be set to 0.3, or the relevance between 'soccer shoes' and 'a vehicle' can be set to 0.001.

In this instance, if people make a direct decision about the relevance between words, it will require a great amount of time and effort. Also, the relevance between words may not be objective since people may input their own subjective concepts in the course of decision making. For example, for 200,000 words, word relevance must be calculated 40 billion times. Therefore, although one word relevance per second may be determined through a manual operation, a great amount of time would be required since 40 billion seconds is 1,268 years. It is also difficult to make an objective decision regarding assigning how many points to the relevance between 'a vehicle' and 'hyundai motors'. Specifically, the determined relevance between words may not be totally reliable.

Accordingly, there is a need for a method and system capable of quickly and objectively calculating the relevance between words.

BRIEF SUMMARY

An aspect of the present invention provides a method and system for calculating a relevance between words based on a document set.

An aspect of the present invention also provides a method and system for calculating a relevance between words, which can express a relevance between words as a numerical value to more effectively search for a document by automatically classifying words or documents, included in a document set, or using a query.

An aspect of the present invention also provides a method and system for calculating a relevance between words based on a document set, which can measure a frequency according to various types of characteristics, generate statistical information about words, standardize the statistical information using vectors, random values, combination probability distributions, and the like, and interpret the standardized statistical information to calculate the relevance between words as a numerical value.

An aspect of the present invention also provides a method and system for calculating a relevance between words based on a document set, which can calculate a relevance between asymmetric words by using a crossing frequency between the words as a discrete random variable set.

According to an aspect of the present invention, there is provided a method of calculating a relevance between words based on a document set, the method including: obtaining statistical information about the words based on at least one of the words, documents, a word classification of the words, and a document classification of the documents, wherein the words and the documents are included in the document set; standardizing the statistical information; and calculating the relevance between the words based on the standardized statistical information.

In an aspect of the present invention, the obtaining may further include: measuring an appearance frequency for each word, wherein the appearance frequency is a number of times that the word appears; measuring a crossing frequency for each word, wherein the crossing frequency is a number of documents that include both the word and another word; generating frequency information based on at least one of the appearance frequency and the crossing frequency; and obtaining as the statistical information at least one of the appearance frequency, the crossing frequency, and the frequency information.

In another aspect of the present invention, the generating of the frequency information may generate as the frequency information at least one of a word-document classification appearance frequency, a document frequency, a document classification frequency, a word-word classification crossing frequency, and a word-word combination frequency, based on the appearance frequency or the crossing frequency.

In still another aspect of the present invention, the word-document classification appearance frequency for each word may be a number of times that the word is included in a document included in the document classification.

According to another aspect of the present invention, there is provided a method of calculating a relevance between words based on a document set, the method including: obtaining statistical information about the words based on at least one of the words, documents, a word classification of the words, and a document classification of the documents, wherein the words and the documents are included in the document set; standardizing the statistical information as a multi-dimensional vector set; and calculating the relevance between the words based on the multi-dimensional vector set.

Additional aspects, features, and/or advantages of the invention will be set forth in part in the description which follows and, in part, will be apparent from the description, or may be learned by practice of the invention.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which:

FIG. 2 is a table illustrating an example of an appearance frequency;

FIG. 3 is a table illustrating an example of a crossing frequency;

FIG. 4 is a table illustrating an example of a word-document classification appearance frequency;

FIG. 5 is a table illustrating an example of a document frequency and a document classification frequency;

FIG. 6 is a table illustrating an example of a word-word classification crossing frequency;

FIG. 7 is a table illustrating an example of a word-word combination frequency;

FIG. 12 illustrates an example of point-wise mutual information;

FIG. 14 is a table illustrating an example of a relevance between words calculated according to various methods.

DETAILED DESCRIPTION OF EMBODIMENTS

Figure 1:
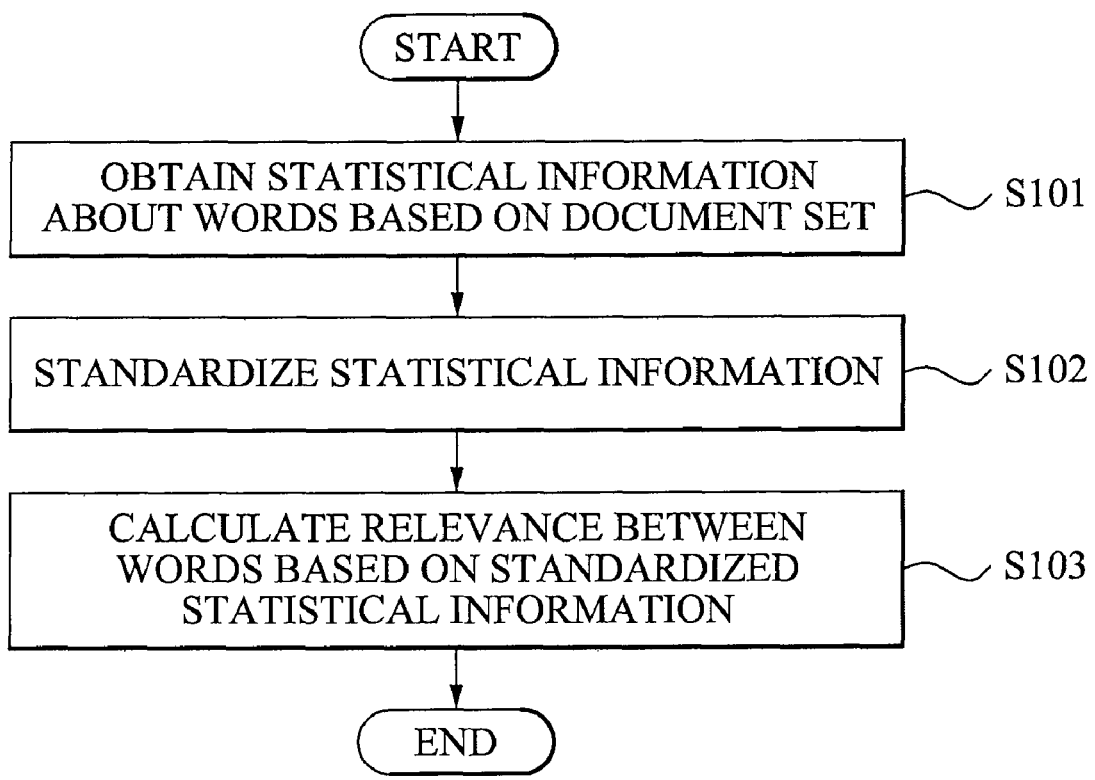
FIG. 1 is a flowchart illustrating a method of calculating a relevance between words based on a document set according to a first embodiment of the present invention.

Embodiments of the present invention will be described in detail in conjunction with the accompanying drawings, wherein like reference numerals refer to like elements throughout.

FIG. 1 is a flowchart illustrating a method of calculating a relevance between words based on a document set according to a first embodiment of the present invention.

In step S101, a system for calculating the relevance between words obtains statistical information about the words based on at least one of the words, documents, a word classification of the words, and a document classification of the documents. The words and the documents are included in a document set.

The word classification and the document classification may denote a set of the words and a set of the documents, respectively. In this instance, the words and the documents are classified using a predetermined classification scheme.

Also, in step S101, the system may measure an appearance frequency for each word and a crossing frequency for each word. The appearance frequency is a number of times that the word appears. The crossing frequency is a number of documents that include both the word and another word.

FIG. 2 is a table 200 illustrating an example of an appearance frequency, and FIG. 3 is a table 300 illustrating an example of a crossing frequency.

The table 200 shows the appearance frequency among seven documents (document 1, document 2, document 3, document 4, document 5, document 6, and document 7) and four words (word 1, word 2, word 3, and word 4). The seven documents and the four words are included in a document set. For example, word 4 has appeared five times in document 5, as shown in a cell 201. Specifically, the appearance frequency of word 4 in document 5 is '5'.

The table 300 is an example of the crossing frequency among word 1 through word 4, and thus shows a number of documents that include both one word and another word. For example, referring to the table 300, a number of documents that include both word 3 and word 4 is '3', as shown in a cell 301. Specifically, the crossing frequency between word 3 and word 4 is '3'.

Also, the system generates frequency information based on at least one of the appearance frequency and the crossing frequency, and obtains as the statistical information at least one of the appearance frequency, the crossing frequency, and the frequency information. In this instance, the system may generate as the frequency information at least one of a word-document classification appearance frequency, a document frequency, a document classification frequency, a word-word classification crossing frequency, and a word-word combination frequency, based on the appearance frequency or the crossing frequency. The frequency information will be further described in detail later with reference to FIGS. 2 and 3, and FIGS. 4 through 7.

FIG. 4 is a table 400 illustrating an example of a word-document classification appearance frequency. The word-document classification appearance frequency for each word is a number of times that the word is included in a document included in the document classification. The word-document classification appearance frequency may be generated based on the appearance frequency.

In the table 400, document classification 1 includes document 1 through document 4 of FIG. 2, and document classification 2 includes document 5 through document 7 of FIG. 2. The table 400 shows, as the word-document classification appearance frequency, the number of times that each of word 1 through word 4 appears in each of document classification 1 and document classification 2.

For example, as shown in FIG. 2, with respect to document 1 through document 4 included in document classification 1, word 1 appeared five times in document 1, seven times in document 2, zero times in document 3, and twice in document 4, respectively. Therefore, the table 400 shows that word 1 appeared 14 times (=5+7+0+2), as shown in a cell 401. Specifically, the word-document classification appearance frequency of word 1 for document classification 1 is '14'.

FIG. 5 is a table 500 illustrating an example of a document frequency 501 and a document classification frequency 502.

The document frequency 501 for each word may denote a number of documents that include the word. The document classification frequency 502 for each word may denote a number of word classifications that include the word.

The table 500 shows the document frequency 501 and the document classification frequency 502 associated with word 1 through word 4. For example, referring to the table 500, the number of documents that include word 4 is '3' as shown in a cell 503. The number of document classifications that include word 4 is '2' as shown in another cell 504.

As shown in the table 200 of FIG. 2, which is an example of the appearance frequency, word 4 is included in document 4, document 5, and document 7. Therefore, the document frequency 501 of word 4 is '3'. Also, word 4 is included in both word classification 1 and word classification 2 and thus the document classification frequency 502 of word 4 is '2'.

FIG. 6 is a table 600 illustrating an example of a word-word classification crossing frequency. The word-word classification crossing frequency for each word may denote a number of documents that are used together with a word included in the word classification.

The table 600 shows the word-word classification crossing frequency between word 1 through word 4 and word classification 1 through word classification 3. In this instance, word classification 1 includes word 1 and word 2, word classification 2 includes word 3, and word classification 3 includes word 4.

For example, the word-word classification crossing frequency of word 1 for word classification 1 is '6' as shown in a cell 601. Referring to the table 300 of FIG. 3, showing the crossing frequency, word 1 has the crossing frequency of '3' with respect to word 1 included in word classification 1, and also has the crossing frequency of '3' with respect to word 2 included in word classification 1. Therefore, the word-word classification crossing frequency of word 1 for word classification 1 is '6' (=3+3).

FIG. 7 is a table 700 illustrating a word-word combination frequency. The word-word combination frequency for each word pair may denote a number of documents that include a pair of words, a number of documents that do not include the pair of words, and a number of documents where the pair of words appear separately.

The table 700 shows the word-word combination frequency for word 1 and word 2. In this instance, superscripts $^o$ and $^x$ denote the appearance and non-appearance of word 1 or word 2. For example, in the case of word $1^o$ 701 and word $2^o$ 702, the number of documents that include both word 1 and word 2 is '3' as shown in a cell 703. Also, in the case of word $2^o$ 702 and word $1^x$ 704, the number of documents that include only word 2, excluding word 1, is '1' as shown in another cell 705.

The word-word combination frequency may be generated based on the appearance frequency. Specifically, in FIG. 2, the number of documents that include both word 1 and word 2 is '3', i.e. document 1, document 2, and document 4. It is the same as '3' which is given in the table 700 of FIG. 7.

As described above, the system may measure the appearance frequency and the crossing frequency using the document set, generate as the frequency information at least one of the word-document classification appearance frequency, the document classification frequency, the word-word classification crossing frequency, and the word-word combination frequency, and obtain as statistical information about words at least one of the appearance frequency, the crossing frequency, and the frequency information.

In step S102, the system standardizes the statistical information. Step S102 relates to the interpretation of the statistical information consisting of various types of information and the standardization of the statistical information in a form that can be used in the system. In step S 102, the system may standardize the statistical information as at least one of a multi-dimensional vector set, a real-number-typed random variable set, a combination probability distribution of random variables, and a discrete random variable set.

Specifically, step S102 of standardizing the statistical information may use any one of following schemes (1) through (4):

(1) The standardization scheme standardizing the statistical information as the multi-dimensional vector may standardize the statistical information by setting, as a column for a multi-dimensional vector set, at least one of the words, the documents, the word classification, and the document classification. Each vector includes each independent dimension in the multi-dimensional space. The standardization scheme may further standardize the statistical information by setting, as a row of the multi-dimensional vector set, the word corresponding to a vector of the multi-dimensional space.

For example, referring to FIG. 2, the standardization method may standardize the statistical information to be represented as, for example, document vectors (0, 0, 0, 3, 5, 0, 6) regarding the appearance frequency of word 4, binary document vectors (0, 0, 0, 1, 1, 0, 1) regarding whether word 4 is included in each document, crossing frequency vectors (1, 1, 3, 3) regarding the crossing frequency between word 4 and each word, and crossing probability vectors (1/3, 1/3, 3/3, 3/3) regarding the probability that each word is included in the same document.

(2) The standardization scheme standardizing the statistical information as the real-number-typed random variable set may standardize the statistical information by setting, as a column of a real-number-typed random variable set, at least one of the words, the documents, the word classification, and the document classification, and by setting, as a row of a real-number-typed random variable set, the word corresponding to a random variable wherein the random variable has a real number value.

For example, the document variable to indicate the appearance frequency of word 4 may have random variable values of 0, 0, 0, 3, 5, 0, and 6. The document variable of word 3 may have random variable values of 4, 6, 4, 5, 8, 7, and 3. Also, the word variable to indicate the crossing frequency of word 4 may have random variable values of 1, 1, 3, and 3.

(3) The standardization scheme standardizing the statistical information as the combination probability distribution may standardize the statistical information by generating a combination probability distribution of a random variable corresponding to a word pair and standardizes the statistical information based on a word-word combination frequency. The word-word combination frequency for each word pair is a number of documents that include a pair of words, a number of documents that do not include the a pair of words, and a number of documents where the pair of words separately appear. The random variable may be defined in a point space of columns and rows that include only appearance or non-appearance points of the word.

The combination probability distribution corresponding to each pair of words may exist. For example, based on the word-word combination frequency, which has been described above with reference to FIG. 7, word 1 and word 2 may have the combination probability distribution, such as (word $1^o$, word $2^o$)=3/7, (word $1^o$, word $2^x$)=0, (word $1^x$, word $2^o$)=1/7, and (word $1^x$, word $2^x$)=3/7. Also, word 4 and word 2 may have the combination probability distribution, such as (word 40, word 20)=1/7, (word $4^o$, word $2^x$)=2/7, (word $4^x$, word $2°)=3/7$, and (word $4^x$, word $2^x$)=1/7. A probability of each combination point of the combination probability distribution may be calculated based on a document frequency and a crossing frequency. The document frequency for each of the words is a number of documents that includes the word and the crossing frequency is a number of documents that include both the word and another word.

(4) The standardization scheme standardizing the statistical information as the discrete random variable set may standardize the statistical information by setting the word as a column of a discrete random variable set to indicate each independent point in an point space where a random variable is defined, and by setting the word as a row of the discrete random variable set to indicate a discrete random variable.

The discrete random variable may be generated based on a crossing frequency that is a number of documents that include both the word and another word. Each frequency value of the discrete random variable set may correspond to the probability that another word (column) may exist with respect to a word (row) included in an arbitrary document.

For example, referring again to FIG. 3, when word 4 is included in the arbitrary document, the probability that word 1 is included in the document is 1/8 and the probability that word 3 is included in the document is 3/8.

In step S103, the system calculates the relevance between the words based on the standardized statistical information. In the case of the multi-dimensional vector set, the system may calculate the relevance between the words based on a distance or an angle between vectors that are included in the multi-dimensional vector set. In the case of the real-number-typed random variable set, the system may calculate the relevance between the words based on a statistical correlation between random variables that are included in the real-number-typed random variable set.

In the case of the combination probability distribution, the system may calculate the relevance between the words based on information about two random variables of the combination probability distribution that is generated based on the statistical information. In the case of the discrete random variable set, the system may calculate the relevance between the words based on the document frequency and the crossing frequency. As described above, the document frequency is a number of documents that include the word, and the crossing frequency is a number of documents that include both the word and another word.

As described above, according to the present invention, it is possible to calculate a relevance between words, which can express a relevance between words as a numerical value to more effectively search for a document by automatically classifying words or documents, included in a document set, or using a query. Also, it is possible to measure a frequency according to various types of characteristics, generate statistical information about words, standardize the statistical information using vectors, random values, combination probability distributions, and the like, and interpret the standardized statistical information to calculate the relevance between words as a numerical value.

Figure 8:
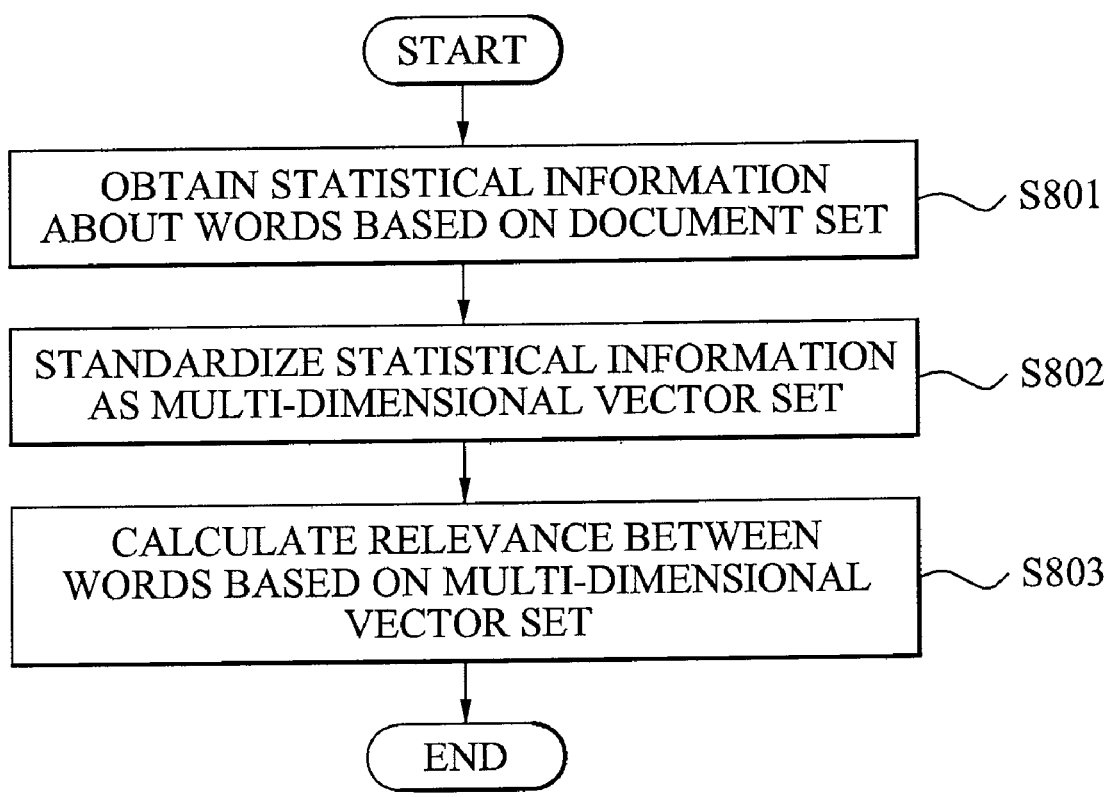
FIG. 8 is a flowchart illustrating a method of calculating a relevance between words based on a document set according to a second embodiment of the present invention.

FIG. 8 is a flowchart illustrating a method of calculating a relevance between words based on a document set according to a second embodiment of the present invention.

In step S801, a system for calculating the relevance between words obtains statistical information about the words based on at least one of the words, documents, a word classification of the words, and a document classification of the documents. The words and the documents are included in the document set. The word classification and the document classification may denote a set of the words and a set of the documents, respectively. In this instance, the words and the documents are classified using a predetermined classification scheme.

Also, in step S801, the system may measure an appearance frequency for each word and a crossing frequency for each word. The appearance frequency is a number of times that the word appears. The crossing frequency is a number of documents that include both the word and another word.

Also, the system generates frequency information based on at least one of the appearance frequency and the crossing frequency, and obtains as the statistical information at least one of the appearance frequency, the crossing frequency, and the frequency information. In this instance, the system may generate as the frequency information at least one of a word-document classification appearance frequency, a document frequency, a document classification frequency, a word-word classification crossing frequency, and a word-word combination frequency, based on the appearance frequency or the crossing frequency.

In step S802, the system standardizes the statistical information as a multi-dimensional vector set. In this instance, the system may standardize the statistical information by setting, as a column for a multi-dimensional vector set, at least one of the words, the documents, the word classification, and the document classification. Each vector includes each independent dimension in the multi-dimensional space. The system may further standardize the statistical information by setting, as a row of the multi-dimensional vector set, the word corresponding to a vector of the multi-dimensional space.

In step S803, the system calculates the relevance between the words based on the multi-dimensional vector set. In this instance, the system may calculate, as the relevance between the words, at least one of an inverse $L_p$, a cosine coefficient, an extended Dice coefficient, an extended Jaccard's coefficient, and a correlation with respect to two vectors a and b of the multi-dimensional vector set.

The inverse $L_p$ is calculated by, $$L_p=1/(1+<a-b>_p^p),$$ [Equation 1]

where $<V>_p$ denotes p-norm of a vector V.

The cosine is calculated by, $$\text{cosine efficient}=(a \cdot b)/(<a>_2<b>_2).$$ [Equation 2]

The extended Dice coefficient is calculated by, $$\text{extended Dice coefficient}=2(a \cdot b)/(<a>_2^2+<b>_2^2).$$ [Equation 3]

The extended Jaccard's coefficient is calculated by, $$\text{extended Jaccard's coefficient}=(a \cdot b)/(<a>_2^2+<b>_2^2-(a \cdot b)).$$ [Equation 4]

In this instance, the extended Dice coefficient and the extended Jaccard's coefficient may be used by extending a Dice coefficient and a Jaccard's coefficient which are representative coefficients that measure a matching degree between features of two comparison targets.

The correlation is calculated by, $$\text{correlation}=(a^* \cdot b^*)/(<a^*>_2<b^*>_2),$$ [Equation 25]

where $a^*_i=a_i-<a>_1/n$, and $<a^*>_1=0$.

The dimension of a vector may use a singular-value decomposition (SVD) to calculate the relevance between words using the vector.

Figure 9:
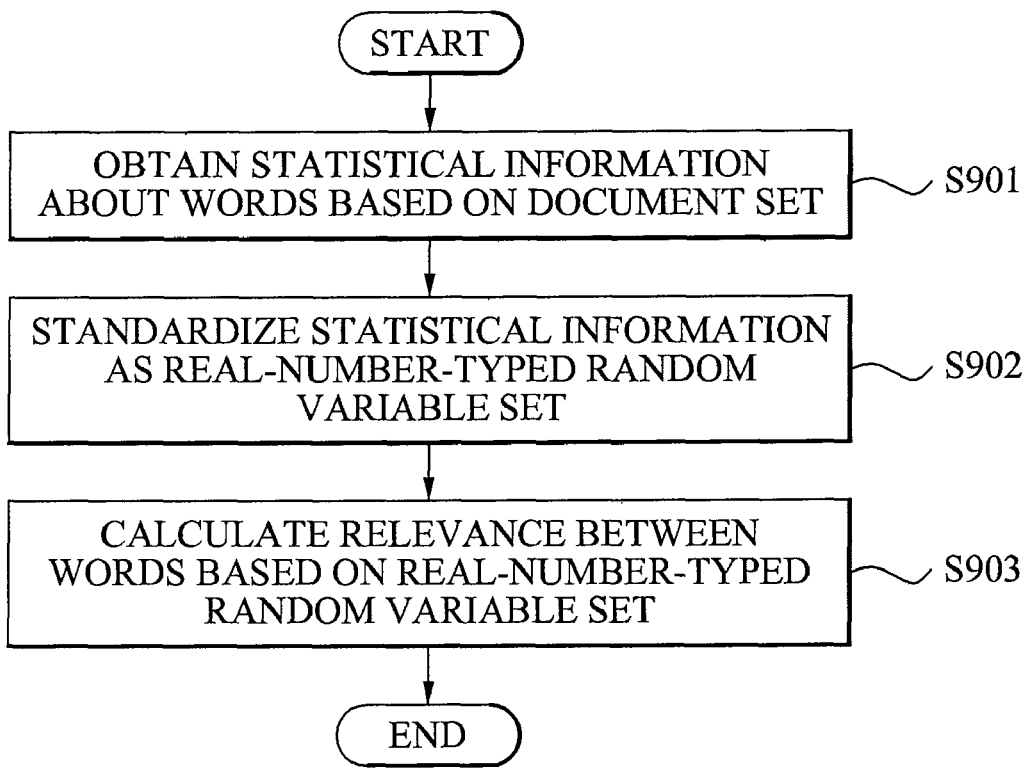
FIG. 9 is a flowchart illustrating a method of calculating a relevance between words based on a document set according to a third embodiment of the present invention.

FIG. 9 is a flowchart illustrating a method of calculating a relevance between words based on a document set according to a third embodiment of the present invention.

In step S901, a system for calculating the relevance between words obtains statistical information about the words based on at least one of the words, documents, a word classification of the words, and a document classification of the documents. The words and the documents are included in the document set. The word classification and the document classification may denote a set of the words and a set of the documents, respectively. In this instance, the words and the documents are classified using a predetermined classification scheme.

Also, in step S901, the system may measure an appearance frequency for each word, and a crossing frequency for each word. The appearance frequency is a number of times that the word appears. The crossing frequency is a number of documents that include both the word and another word.

Also, the system generates frequency information based on at least one of the appearance frequency and the crossing frequency, and obtains as the statistical information at least one of the appearance frequency, the crossing frequency, and the frequency information. In this instance, the system may generate as the frequency information at least one of a word-document classification appearance frequency, a document frequency, a document classification frequency, a word-word classification crossing frequency, and a word-word combination frequency, based on the appearance frequency or the crossing frequency.

In step S902, the system standardizes the statistical information as a real-number-typed random variable set. In this instance, the system may standardize the statistical information by setting, as a column of a real-number-typed random variable set, at least one of the words, the documents, the word classification, and the document classification, and by setting, as a row of the real-number-typed random variable set, the word corresponding to a random variable wherein the random variable has a real number value.

In step S903, the system calculates the relevance between words based on the real-number-typed random variable set. In this instance, the system may calculate, as the relevance between the words, at least one of a Pearson's correlation coefficient and a coherence with respect to two random variables X and Y of the real-number-typed random variable set.

The Pearson's correlation efficient is calculated by, $$\text{Pearson's correlation coefficient} = (E(XY) - E(X)E(Y))/(\sigma_X \sigma_Y),$$ [Equation 6]

where $\sigma$ denotes a standard deviation.

The Pearson's correlation coefficient may have the same value as the correlation of the second embodiment.

The coherence is calculated by, $$\text{coherence} = (E(|XY|)^2/(E(X^2)E(Y^2)))^{0.5}.$$ [Equation 7]

When $X \geq 0$ and $Y \geq 0$, the coherence may have the same value as the cosine coefficient of the second embodiment.

When it is assumed that an abstraction attempt of the random variable is an independent dimension, the abstraction attempt becomes the same as the multi-dimensional vector of the second embodiment. A number of measurement values for the abstraction attempt is generally large and thus it is possible to use the SVD for the relevance between words that is calculated using the real-number-typed random variable set.

In addition to the Pearson's correlation coefficient and the coherence, the method of calculating the relevance between words using the real-number-typed random variable set may use Spearman's rho, Kendall's tau, and the like.

Figure 10:
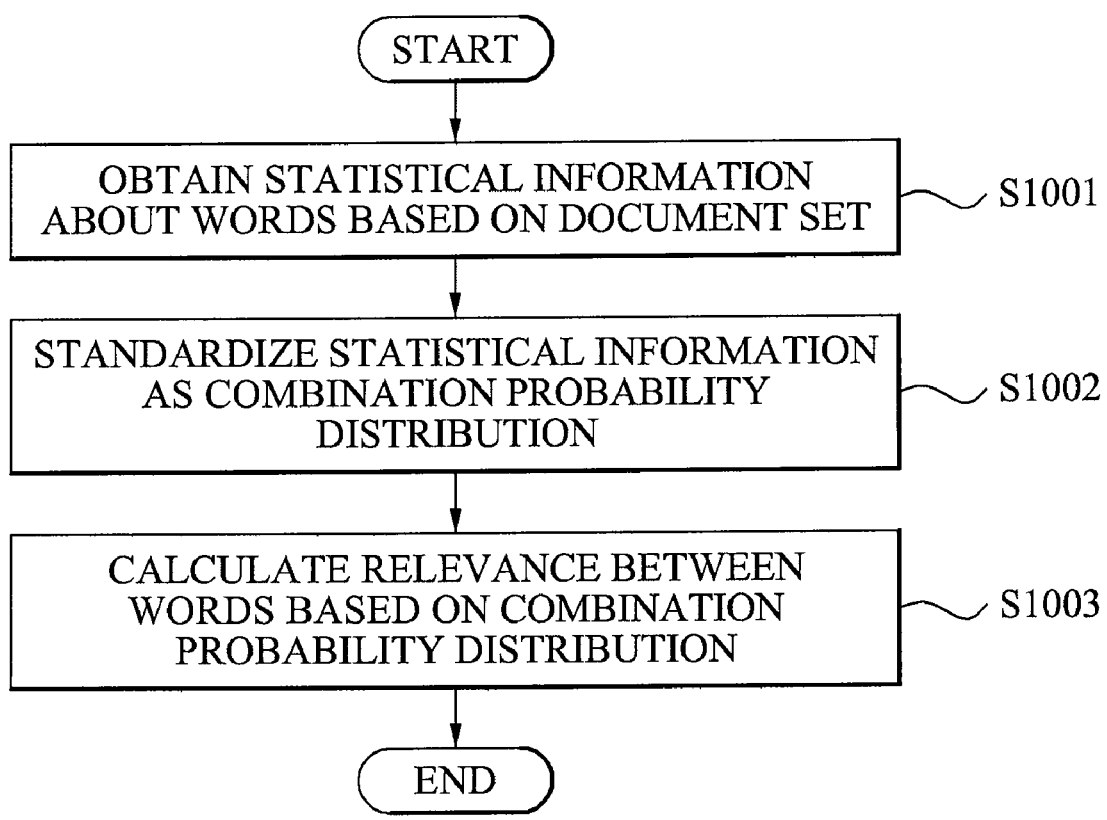
FIG. 10 is a flowchart illustrating a method of calculating a relevance between words based on a document set according to a fourth embodiment of the present invention.

FIG. 10 is a flowchart illustrating a method of calculating a relevance between words based on a document set according to a fourth embodiment of the present invention.

In step S1001, a system for calculating the relevance between words obtains statistical information about the words based on at least one of the words, documents, a word classification of the words, and a document classification of the documents. The words and the documents are included in the document set. The word classification and the document classification may denote a set of the words and a set of the documents, respectively. In this instance, the words and the documents are classified using a predetermined classification scheme.

Also, in step S1001, the system may measure an appearance frequency for each word and a crossing frequency for each word. The appearance frequency is a number of times that the word appears. The crossing frequency is a number of documents that include both the word and another word.

Also, the system generates frequency information based on at least one of the appearance frequency and the crossing frequency, and obtains as the statistical information at least one of the appearance frequency, the crossing frequency, and the frequency information. In this instance, the system may generate as the frequency information at least one of a word-document classification appearance frequency, a document frequency, a document classification frequency, a word-word classification crossing frequency, and a word-word combination frequency, based on the appearance frequency or the crossing frequency.

In step S1002, the system standardizes the statistical information as a combination probability distribution of random variables. The system may standardize the statistical information by generating a combination probability distribution of a random variable corresponding to a word pair and standardizes the statistical information based on a word-word combination frequency. The word-word combination frequency for each word pair is a number of documents that include a pair of words, a number of documents that do not include the pair of words, and a number of documents where the pair of words appear separately.

Specifically, the combination probability distribution corresponding to the pair of words may exist. Also, the random variable may be defined in a point space of columns and rows that include only appearance or non-appearance points of the word.

In step S1003, the system may calculate the relevance between words based on the combination probability distribution. The system may calculate, as the relevance between the words, at least one of a Jaccard's coefficient, a Dice coefficient, an odds-ratio, mutual information, and point-wise mutual information with respect to two random variables A and B by using the combination probability distribution that is represented as, $$p(A=a^o, B=b^o)=poo, \ p(A=a^o, B=b^x)=pox,$$

$$p(A=a^x, B=b^o)=pxo, \ p(A=a^x, B=b^x)=pxx.$$ [Equation 8]

The Jaccard's coefficient is calculated by, $$\text{Jaccard's coefficient} = poo/(poo+pox+pxo).$$ [Equation 9]

In this instance, the Jaccard's coefficient may be the same as the extended Dice coefficient based on the binary document vector of the second embodiment.

The Dice coefficient is calculated by, $$\text{Dice coefficient} = 2 \cdot poo/(2 \cdot poo+pox+pxo).$$ [Equation 10]

In this instance, the Dice coefficient may be the same as the extended Dice coefficient based on the binary document vector of the second embodiment.

The odds ratio is calculated by, $$\text{odds ratio} = \log(poo+0.5)(pxx+0.5) - \log(pox+0.5)(pxo+0.5).$$ [Equation 11]

Also, the mutual information with respect to two random variables X and Y may be represented as, $$\text{mutual information } (I(X, Y)) = H(X) + H(Y) - H(X, Y), \quad \text{[Equation 12]}$$

where H(X) denotes an amount of information that is an addition of (−p(x)log p(x)) with respect to each point x within a point space X. The mutual information that is based on the amount of formation may denote an addition of p(x, y)(log p(x, y)−log p(x)p(y)) with respect to each combination point (x, y) within the combination point space (X, Y).

Figure 11:
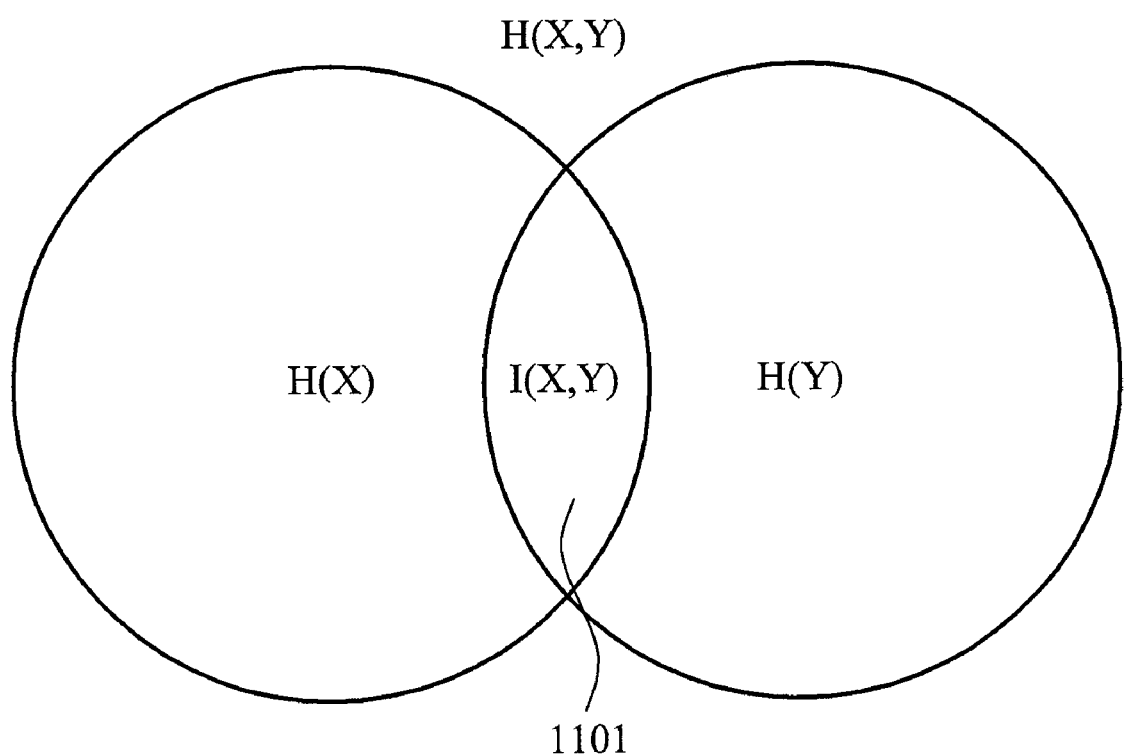
FIG. 11 is a diagram illustrating an example of mutual information.

FIG. 11 is a diagram illustrating an example of mutual information. A shared portion 1101 may indicate the mutual information, and also may denote the size of information amount that the random variables X and Y share. The mutual information itself may be an absolute value of the shared information amount.

The mutual information may be standardized in a form of the Jaccard's coefficient as given by, $$I(X, Y)/(H(X)+H(Y)-I(X, Y))=I(X, Y)/H(X, Y). \quad \text{[Equation 13]}$$

Also, the mutual information may be standardized in a form of the Dice coefficient as given by, $$2I(X, Y)/(H(X)+(H(Y)). \quad \text{[Equation 14]}$$

Also, the mutual information may be defined in a different form, given by, $$MI(\text{mutual information})=\log p(x, y)-\log p(x)p(y), \text{ or} \quad \text{[Equation 15]}$$

$$\text{Average-}MI=\Sigma_x\Sigma_y p(x, y)(\log p(x, y)-\log p(x)p(y)). \quad \text{[Equation 16]}$$

The point-wise mutual information denotes an amount of information that a particular combined point (x, y) has with respect to two random variables X and Y within a combined point space (X, Y), and is given by, $$\text{point-wise mutual information}=p(x, y)(\log p(x, y)-\log p(x)p(y)). \quad \text{[Equation 17]}$$

FIG. 12 illustrates an example of point-wise mutual information. For example, it is assumed that a point that selects an arbitrary word in a document is referred to as X and a point that selects a subsequent word is referred to as Y In this case, when the document is {a, b, c, a, b, d}, the frequency of the points X and Y may be represented like a table 1201. The mutual information that is given by an addition of p(x, y)(log p(x, y)−log p(x)p(y)) may be calculated like a result 1202.

Also, the point-wise mutual information, i.e. pmi, which is an amount of information about a particular combination point, may be calculated as in a box 1203. Specifically, the point-wise mutual information relates to pairs of documents (a, b), (b, c), (b, d), and (c, a) that satisfy the points X and Y.

Figure 13:
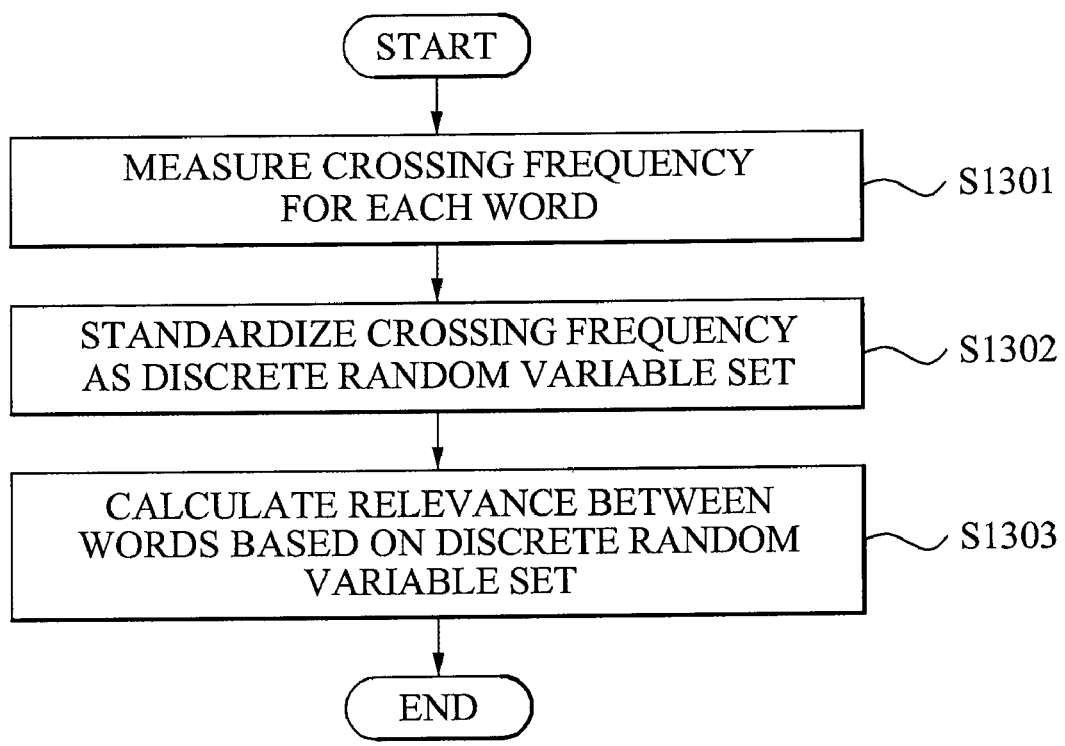
FIG. 13 is a flowchart illustrating a method of calculating a relevance between words based on a document set according to a fifth embodiment of the present invention.

FIG. 13 is a flowchart illustrating a method of calculating a relevance between words based on a document set according to a fifth embodiment of the present invention.

The relevance between words that is calculated according to the second through the fourth embodiments are basically asymmetric to each other. Specifically, regarding two words a and b of the document set, a word relevance value (a, b) is the same as a word relevance value (b, a).

However, the word relevance of the word b for the word a may be different from the word relevance of the word a for the word b. For example, the word relevance of 'Kia motors' for 'car clinic' may be different from the word relevance of 'car clinic' for 'Kia motors'.

Hereinafter, the method of calculating the relevance between asymmetric words according to the fifth embodiment of will be described in detail with reference to FIG. 13.

In step S1301, a system for calculating the relevance between words measures a crossing frequency for each word. The crossing frequency is a number of documents that include both a word, included in a document set, and another word.

In step S1302, the system standardizes the crossing frequency as a discrete random variable set. In this instance, the system may set each word, included in a column of the discrete random variable set, as each independent point in a point space where a random variable is defined, and set each word, included in a row of the discrete random variable set, as a discrete random variable. A crossing frequency value of the discrete random variable corresponds to a probability that when a word v included in the row exists, a word w included in the column exists, and may be represented as, $$\text{crossing frequency value}=p(w|v), \quad \text{[Equation 18]}$$

where the crossing frequency value denotes a ratio of a crossing frequency of v and w with respect to an addition of a crossing frequency of v and k, and k denotes all the words. For example, referring to FIG. 3, p(word 1|word 4)=1/8, p(word 3|word 4)=3/8, and p(word 4|word 4)=3/8.

In step S 1303, the system calculates the relevance between words based on the discrete random variable set. In this instance, the relevance may be calculated as, $$\text{relevance } f(w|v)=p(w|v)-C1\cdot p^*(w)\cdot(1+0.01/(C2+p^*(w))), \quad \text{[Equation 19]}$$

where the relevance between the words is set to 0 when the relevance is calculated to be less than 0, p*(w) denotes an addition of p(w|v)p(v) with respect to all the words v, p(v) denotes a ratio of a document frequency of v with respect to an addition of a document frequency of k, and k denotes all the words.

FIG. 14 is a table illustrating an example of a relevance between words calculated according to various methods. As shown in FIG. 14, regarding word 1 through word 4, which are described above with reference to FIGS. 2 through 7, the table shows the relevance of word 1 for other words (word 2 through word 4).

A column 1401 denotes the relevance between words using the inverse Lp for a document vector associated with word 1, and another column 1402 denotes the relevance between words using a cosine coefficient for the document vector. Also, still another column 1403 denotes the relevance between words using an extended Dice coefficient for the document vector and another column 1404 denotes the relevance between words using an extended Jaccard's coefficient for the document vector. Also, another column 1405 denotes the relevance between words using the correlation for the document vector.

In addition to the document vector, a frequency vector and a binary document vector associated with word 1 may represent the relevance between words using the inverse Lp, the cosine coefficient, the extended Dice coefficient, the extended Jaccard's coefficient, and the correlation.

Also, another column 1406 denotes the relevance between words using the odds ratio for the combination probability distribution associated with word 1, and another column 1407 denotes the relevance between words using the mutual information (mi) for the combination probability distribution. Also, another column 1408 denotes the relevance between words using the mutual information that is standardized in a form of the Jaccard's coefficient for the combination probability distribution.

Also, another column 1409 denotes a probability that word 1 may exist when another word exist for the discrete random variable set associated with word 1, and another column 1410 denotes the relevance between words using the probability.

A plurality of relevance between words, calculated as above, may be used for classifying words or document, searching for a document, and the like. For example, words may be classified by clustering related words, for example, 'a defense', 'a forward', 'a goal keeper', 'a soccer ball', 'a midfielder', 'a grass field', and 'soccer shoes', using the relevance between words and designating a word classification name, for example, 'soccer'. Also, it is possible to generate the relevance between a word and a document using the word relevance and search for a document using the generated relevance. Also, the relevance between words may be used to understand which word the document is associated with and thereby classify documents.

Figure 15:
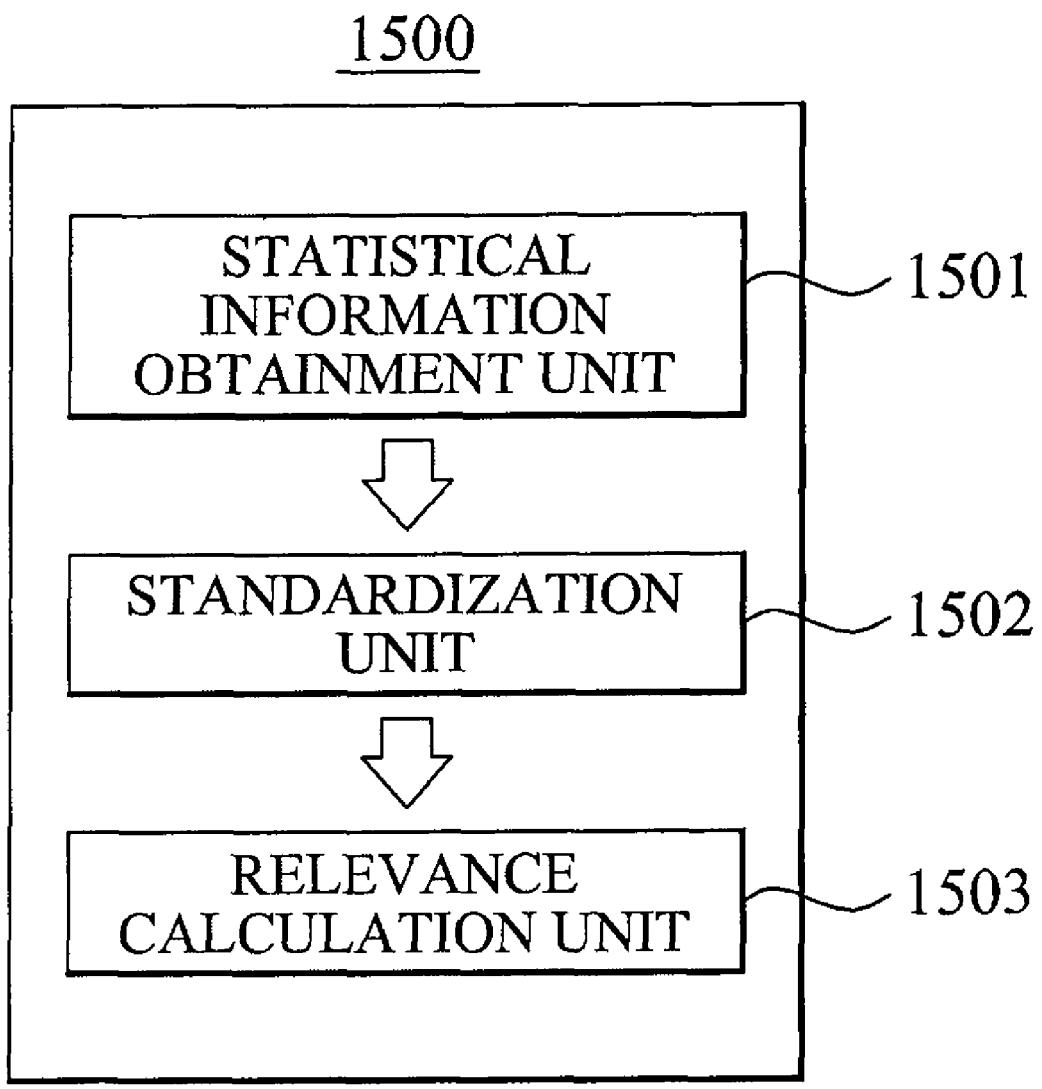
FIG. 15 is a block diagram illustrating an internal configuration of a system for calculating a relevance between words according to a sixth embodiment of the present invention.

FIG. 15 is a block diagram illustrating an internal configuration of a system 1500 for calculating the relevance between words according to an embodiment of the present invention. As shown in FIG. 15, the system 1500 may include a statistical information obtainment unit 1501, a standardization unit 1502, and a relevance calculation unit 1503.

The statistical information obtainment unit 1501 obtains statistical information about the words based on at least one of the words, documents, a word classification of the words, and a document classification of the documents. The words and the documents are included in the document set. In this instance, the statistical information obtainment unit 1501 may include: an appearance frequency measurement unit (not shown) operable to measure an appearance frequency for each word, wherein the frequency is a number of times that the word appears; a crossing frequency measurement unit (not shown) operable to measure a crossing frequency for each word, wherein the crossing frequency is a number of documents that include both the word and another word; a frequency information generation unit (not shown) operable to generate frequency information based on at least one of the appearance frequency and the crossing frequency; and an obtainment unit (not shown) operable to obtain as the statistical information at least one of the appearance frequency, the crossing frequency, and the frequency information.

The frequency information may include at least one of a word-document classification appearance frequency, a document frequency, a document classification frequency, a word-word classification crossing frequency, and a word-word combination frequency, which may be measured based on the appearance frequency or the crossing frequency.

The word-document classification appearance frequency for each word may be a number of times that the word is included in a document included in the document classification. The word-document classification appearance frequency may be generated based on the appearance frequency.

Also, the document frequency for each word may be a number of documents that include the word, and the document classification frequency for each word may be a number of word classifications that include the word. The document frequency and the word classification frequency may be measured based on the appearance frequency.

The word-word classification crossing frequency for each word may be a number of documents that are used together with a word included in the word classification, and may be measured based on the crossing frequency. Also, the word-word combination frequency for each word pair may be a number of documents that include a pair of words, a number of documents that do not include the pair of words, and a number of documents where the pair of words separately appear, and may be measured based on the appearance frequency.

The standardization unit 1502 standardizes the statistical information. The standardization unit 1502 may standardize the statistical information as at least one of a multi-dimensional vector set, a real-number-typed random variable set, a combination probability distribution of random variables, and a discrete random variable set.

Specifically, the standardization unit 1502 may standardize the statistical information by using any one of following schemes (1) through (4):

(1) The standardization scheme may standardize the statistical information as the multi-dimensional vector by setting, as a column for a multi-dimensional vector set, at least one of the words, the documents, the word classification, and the document classification. Each vector includes each independent dimension in the multi-dimensional space. The standardization scheme may further standardize the statistical information as the multi-dimensional vector by setting, as a row of the multi-dimensional vector set, the word corresponding to a vector of the multi-dimensional space.

(2) The standardization scheme may standardize the statistical information as the real-number-typed random variable set by setting, as a column of a real-number-typed random variable set, at least one of the words, the documents, the word classification, and the document classification, and by setting, as a row of a real-number-typed random variable set, the word corresponding to a random variable wherein the random variable has a real number value.

(3) The standardization scheme may standardize the statistical information as the combination probability distribution by generating a combination probability distribution of a random variable corresponding to a word pair and standardizes the statistical information based on a word-word combination frequency. The word-word combination frequency for each word pair is a number of documents that include a pair of words, a number of documents that do not include the pair of words, and a number of documents where the pair of words separately appear. The random variable may be defined in a point space of columns and rows that include only appearance or non-appearance points of the word.

(4) The standardization scheme may standardize the statistical information as the discrete random variable set by setting the word as a column of a discrete random variable set to indicate each independent point in an point space where a random variable is defined; and by setting the word as a row of the discrete random variable set to indicate a discrete random variable. The discrete random variable may be generated based on a crossing frequency that is a number of documents that include both the word and another word. Each frequency value of the discrete random variable set may correspond to the probability that another word (column) may exist with respect to a word (row) included in an arbitrary document.

The relevance calculation unit 1503 calculates the relevance between words based on the standardized statistical information. In this instance, when the statistical information is standardized as the multi-dimensional vector set, the relevance calculation unit 1503 may calculate, as the relevance between the words, at least one of an inverse $L_p$, a cosine coefficient, an extended Dice coefficient, an extended Jaccard's coefficient, and a correlation with respect to two vectors a and b of the multi-dimensional vector set.

Also, when the statistical information is standardized as the real-number-typed random variable set, the relevance calculation unit 1503 may calculate, as the relevance between the words, at least one of a Pearson's correlation coefficient and a coherence with respect to two random variables of the real-number-typed random variable set.

Also, when the statistical information is standardized as the combination probability distribution, the relevance calculation unit 1503 may calculate, as the relevance between the words, at least one of a Jaccard's coefficient, a Dice coefficient, an odds-ratio, mutual information, and point-wise mutual information with respect to two random variables by using the combination probability distribution.

Also, when the statistical information is standardized as the discrete random variable set, the relevance calculation unit 1503 may calculate the relevance between the words as represented as, $$\text{relevance } f(w|v) = p(w|v) - C1 \cdot p^*(w) \cdot (1 + 0.01/(C2 + p^*(w))), \quad \text{[Equation 20]}$$

where the relevance between the words is set to 0 when the relevance is calculated to be less than 0, $p^*(w)$ denotes an addition of $p(w|v)p(v)$ with respect to all the words v, $p(v)$ denotes a ratio of a document frequency of v with respect to an addition of a document frequency of k, and k denotes all the words.

As described above, according to the present invention, by using a system for calculating a relevance between words, it is possible to calculate a relevance between words, which can express a relevance between words as a numerical value to more effectively search for a document by automatically classifying words or documents, included in a document set, or using a query. Also, it is possible to measure a frequency according to various types of characteristics, generate statistical information about words, standardize the statistical information using vectors, random values, combination probability distributions, and the like, and interpret the standardized statistical information to calculate the relevance between words as a numerical value.

Also, it is possible to calculate a relevance between asymmetric words by using the crossing frequency as the discrete random variable set.

According to the above-described embodiments of the present invention, it is possible to express a relevance between words as a numerical value to more effectively search for a document by automatically classifying words or documents, included in a document set, or using a query.

Also, according to the above-described embodiments of the present invention, it is possible to measure a frequency according to various types of characteristics, generate statistical information about words, standardize the statistical information using vectors, random values, combination probability distributions, and the like, and interpret the standardized statistical information to calculate the relevance between words as a numerical value.

Also, according to the above-described embodiments of the present invention, it is possible to calculate a relevance between asymmetric words by using a crossing frequency between the words as a discrete random variable set.

Exemplary embodiments of the present invention have been shown and described above for illustrative purposes. The present invention is not limited to the described embodiments. Instead, those skilled in the art will appreciate that changes may be made to these embodiments without departing from the principles and spirit of the invention, the scope of which is defined by the claims and their equivalents.

What is claimed is:

1. A method, using a processor, of calculating relevance among words based on a relevance of each word in a document, the method comprising:
    generating statistical information associated with relevance among words by calculating a crossing frequency of words associated with a number of times of each of cross-word being appeared in a document, an appearance frequency of a word, or a word-word combination frequency associated with an appearance and a non-appearance of a combination of a first word and a second word, wherein the appearance frequency is a number of times that a word appears and frequency information is generated based on one of the appearance frequency or the crossing frequency, or the word-word combination frequency to provide the statistical information, the calculation being performed by the processor according to word-word or word-document classification;
    standardizing the statistical information by applying a parameter to the calculated statistical information, wherein the standardizing the statistical information comprises generating a combination probability distribution of a random variable corresponding to a pair of words and standardizing the statistical information based on the word-word combination frequency, wherein the word-word combination frequency associated with the pair of words is a number of documents that include all words in the pair, a number of documents that do not include any word in the pair, and a number of documents that include one of the words in the pair, and wherein the random variable is defined in a point space of columns and rows that comprise appearance or non-appearance points of the word;
    determining, by the processor, the relevance among the words as a numerical value based on the standardization; and
    providing the numerical value associated with the relevance among words to a search system.

2. The method of claim 1, wherein the frequency information comprises one of a word-document classification appearance frequency, a document frequency, a document classification frequency, a word-word classification crossing frequency, or any combination thereof.

3. The method of claim 2, wherein the word-document classification appearance frequency associated with words is a number of times that each word is included in a document which is classified by the document classification.

4. The method of claim 2, wherein the document frequency associated with words is a number of documents that include one or more of the words, and the document classification frequency comprises a number of document classifications that include the one or more of word.

5. The method of claim 2, wherein the word-word classification crossing frequency associated with words comprise a word-reference frequency that a number of documents that include one or more of the words which is classified by the word classification.

6. The method of claim 2, wherein the word-word combination frequency associated with words in a number of documents comprises a pair of the first word and the second word, a number of documents that do not include any pair of the first word and the second word, or a number of documents that include one of the pair of the first word and the second word.

7. The method of claim 1, wherein the standardizing the statistical information further comprises:
    setting, as a column for a multi-dimensional vector set, at least one of the words, the documents, the word classification, or the document classification, wherein each vector comprises each independent dimension in the multi-dimensional space; and
    setting, as a row of the multi-dimensional vector set, the word corresponding to a vector of the multi-dimensional space.

8. The method of claim 1, wherein the standardizing the statistical information further comprises:

setting, as a column of a real-number-typed random variable set, at least one of the words, the documents, the word classification, or the document classification; and setting, as a row of a real-number-typed random variable set, the word corresponding to a random variable, wherein the random variable comprises a real number value, and the random variable comprises, as a random variable value, a frequency value corresponding to the column and the row.

9. The method of claim 1, wherein the standardizing the statistical information further comprises:

setting the word as a column of a discrete random variable set to indicate each independent point in a point space where a random variable is defined; and setting the word as a row of the discrete random variable set to indicate a discrete random variable, wherein the discrete random variable is generated based on the crossing frequency associated with words comprising a first word and a second word that is a number of documents that include both the first word and the second word.

10. The method of claim 1, wherein the calculation comprises calculating the relevance among the words based on a distance or an angle between vectors that are included in a multi-dimensional vector set, wherein the multi-dimensional vector set is determined based on the generated statistical information.

11. The method of claim 1, wherein the calculation comprises calculating the relevance between the words based on a statistical correlation between random variables, wherein the random variables are included in a real-number-typed random variable set that is determined based on the generated statistical information.

12. The method of claim 1, wherein the calculation comprises calculating the relevance between the words based on information about two random variables of a combination probability distribution that is determined based on the generated statistical information.

13. The method of claim 1, wherein the calculation comprises calculating the relevance among the words comprising a first word and a second word based on a document frequency and a crossing frequency wherein the document frequency is a number of documents that include one of the first word and the second word, and the crossing frequency is a number of documents that include both the first word and the second word.

14. A method, using a processor, of calculating relevance among words based on a relevance of each word in a document, the method comprising:

generating statistical information associated with relevance among words by calculating a crossing frequency of words associated with a number of times of each of cross-word being appeared in a document, an appearance frequency of a word, or a word-word combination frequency associated with an appearance and a non-appearance of a combination of a first word and a second word, wherein the appearance frequency is a number of times that a word appears and frequency information is generated based on one of the appearance frequency or the crossing frequency, or the word-word combination frequency to provide the statistical information, the calculation is performed by the processor according to word-word and word-document classification;

standardizing the statistical information by applying a multi-dimensional vector set to the statistical information, wherein the standardizing the statistical information comprises generating a combination probability distribution of a random variable corresponding to a pair of words and standardizing the statistical information based on the word-word combination frequency, wherein the word-word combination frequency associated with the pair of words is a number of documents that include all words in the pair, a number of documents that do not include any word in the pair, and a number of documents that include one of the words in the pair, and wherein the random variable is defined in a point space of columns and rows that comprise appearance or non-appearance points of the word;

determining, by the processor, the relevance among the words as a numerical value based on the standardization; and providing the numerical value associated with the relevance among words to a search system.

15. The method of claim 14, wherein determining the relevance among the words comprises calculating the appearance frequency data by using one of an inverse Lp, a cosine coefficient, an extended Dice coefficient, an extended Jaccard's coefficient, a correlation with respect to two vectors a and b of the multi-dimensional vector set, or any combination thereof.

16. A method, using a processor, of calculating a relevance among words based on a relevance of each word in a document, the method comprising:

generating statistical information associated with relevance among words by calculating a crossing frequency of words associated with a number of times of each of cross-word being appeared in a document, an appearance frequency of a word, or a word-word combination frequency associated with an appearance and a non-appearance of a combination of a first word and a second word, wherein the appearance frequency is a number of times that a word appears and frequency information is generated based on one of the appearance frequency or the crossing frequency, or the word-word combination frequency to provide the statistical information, the calculation is performed by the processor according to word-word and word-document classification;

standardizing the statistical information by applying a parameter to the calculated statistical information, wherein the standardizing the statistical information comprises generating a combination probability distribution of a random variable corresponding to a pair of words and standardizing the statistical information based on the word-word combination frequency, wherein the word-word combination frequency associated with the pair of words is a number of documents that include all words in the pair, a number of documents that do not include any word in the pair, and a number of documents that include one of the words in the pair, and wherein the random variable is defined in a point space of columns and rows that comprise appearance or non-appearance points of the word;

determining, by the processor, the relevance among the words as a numerical value based on the standardization; and providing the numerical value associated with the relevance among words to a search system.

17. The method of claim 16, wherein determining the relevance among the words comprises calculating the appearance frequency data by using one of a Pearson's correlation coefficient, a coherence with respect to two random variables X and Y of the real-number-typed random variable set, or any combination thereof.

18. A system for calculating relevance among words based on relevance of each word in a document, the system comprising:
a statistical information unit, coupled to a processor, to generate statistical information associated with relevance among words according to word-word and word-document classification by calculating a crossing frequency of words associated with a number of times of each of cross-word being appeared in a document, an appearance frequency of a word, or a word-word combination frequency associated with an appearance and a non-appearance of a combination of a first word and a second word, wherein the appearance frequency is a number of times that a word appears and frequency information is generated based on one of the appearance frequency or the crossing frequency, or the word-word combination frequency to provide the statistical information, the calculation is performed by the processor according to the classification; and
a standardization unit to standardize the statistical information by applying a parameter to the statistical information, wherein to standardize the statistical information comprises to generate a combination probability distribution of a random variable corresponding to a pair of words and to standardize the statistical information based on the word-word combination frequency, wherein the word-word combination frequency associated with the pair of words is a number of documents that include all words in the pair, a number of documents that do not include any word in the pair, and a number of documents that include one of the words in the pair, and wherein the random variable is defined in a point space of columns and rows that comprise appearance or non-appearance points of the word, and
wherein the relevance among the words is determined by the processor based on the standardized statistical information.

19. The system of claim 18,
wherein the statistical information unit comprises:
an appearance frequency measurement unit to measure the appearance frequency associated with each word, wherein the frequency is a number of times that a word appears;
a crossing frequency measurement unit to measure the crossing frequency;
a frequency information unit to generate frequency information based on at least one of the appearance frequency or the crossing frequency to provide the statistical information with at least one of the appearance frequency, the crossing frequency, or the frequency information.

20. The system of claim 18, wherein the standardization unit is configured to standardize the statistical information using at least one of a multi-dimensional vector set, a real-number-typed random variable set, a combination probability distribution of random variables, a discrete random variable set, or any combination thereof.

21. The system of claim 18, wherein the relevance among words is determined by using at least one of an inverse Lp, a cosine coefficient, an extended Dice coefficient, an extended Jaccard's coefficient, a correlation with respect to two vectors a and b of the multi-dimensional vector set, or any combination thereof.

22. The system of claim 18, wherein the relevance among words is determined by using at least one of a Pearson's correlation coefficient, a coherence with respect to two random variables of the real-number-typed random variable set, or any combination thereof.

23. The system of claim 18, wherein the relevance among words is determined by using at least one of a Jaccard's coefficient, a Dice coefficient, an odds-ratio, mutual information, point-wise mutual information with respect to two random variables comprising A and B by using the combination probability distribution, or any combination thereof.

* * * * *